July 9, 1968  E. J. POLLEY, JR  3,391,582
REMOVABLE HANDLEBAR
Filed Nov. 1, 1967
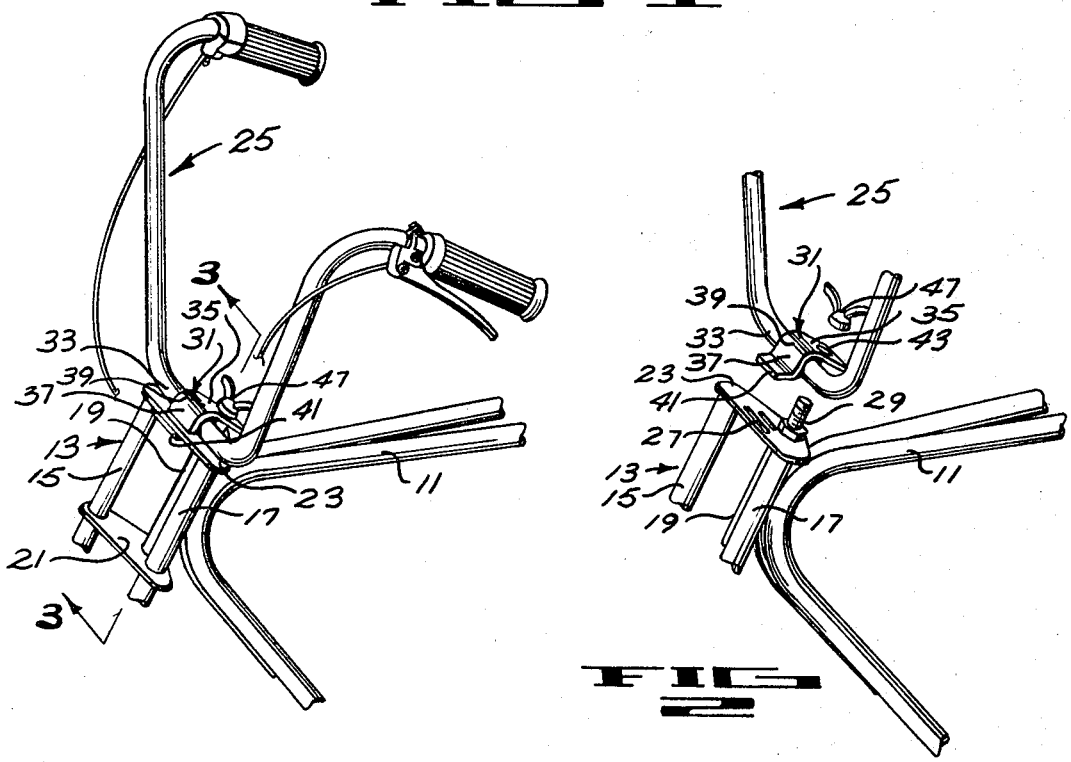
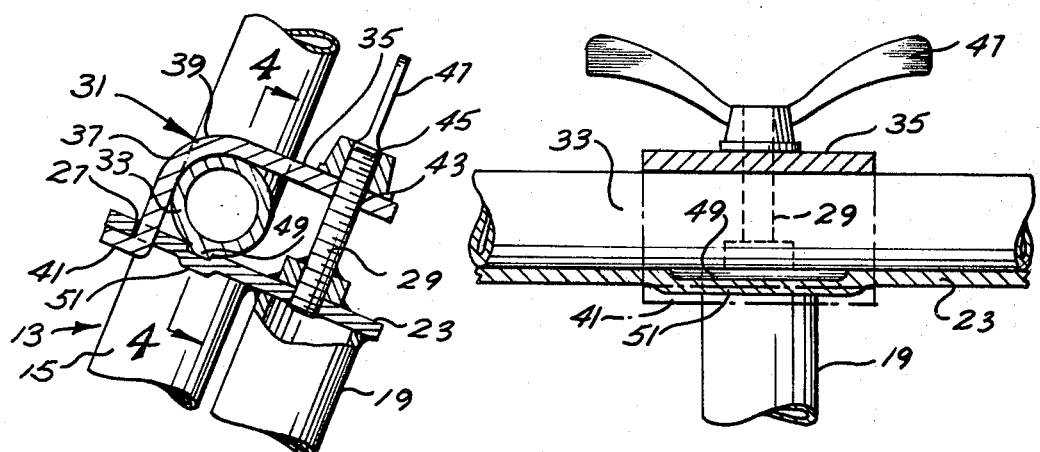
INVENTOR.
EDWARD J. POLLEY, JR.
BY
Sokolski & Wohlgemuth
ATTORNEYS

United States Patent Office 3,391,582
Patented July 9, 1968

3,391,582
REMOVABLE HANDLEBAR
Edward J. Polley, Jr., Inglewood, Calif., assignor to Nova Products of California, Inc., Gardena, Calif., a corporation of California
Filed Nov. 1, 1967, Ser. No. 679,678
10 Claims. (Cl. 74—551.1)

ABSTRACT OF THE DISCLOSURE

A removable handlebar for motorbikes, motorcycles, bicycles, and the like, comprised of a plate affixed to the frame of the bike, having an aperture therein and a threaded stud rising therefrom. The handlebar has a bracket rigidly affixed thereto which has a curved portion that passes through the aperture in the plate and has an opening through which the stud passes so that the handlebar can be affixed by means of a wing nut or the like to the plate. The plate may further be provided with a slight indentation adjacent the handlebar, the handlebar having corresponding raised portion to seat in the indentation to further secure it.

---

In view of the increased interest in camping and exploring the outdoors, lightweight compact motorbikes and motorcycles have gained considerable attention. The ability to readily disassemble components of these bikes is quite important in their utilization. Often it is desired to store the bike in the trunk of an automobile or on top of luggage racks, or in other convenient locations on larger vehicle carriers. One of the items adding most greatly to the overall bulk size of a motorbike is the handlebars. Thus it is desirable to be able to readily and quickly detach them from the bike for storage purposes. Most handlebars are detachable after considerable effort. No handlebars are easily detachable without the utilization of a wrench or the like in a very short period of time. In order to provide for an easy disassembly of the handlebars from the bike it is important that the handlebars when affixed to the bike are in an extremely secure position. One can obviously not compromise the security of the handlebars when the bike is operating for the sake of having easy disassembly.

It is an object of this invention to provide a novel device for the ready attachment and disassembly of a handlebar from a bike frame.

Another object of this invention is to provide a device for the ready disassembly of a handlebar from a bike frame which insures rigid and safe affixation when the handlebar is in place on the bike.

The above and other objects of this invention are accomplished by a conventional handlebar having rigidly affixed thereto a bracket member. The bracket cooperates with a plate affixed to the frame of the bike where the handlebar is to be placed, such that the handlebar rests on the plate. The support plate is provided with a slot which is preferably forward of the handlebars when the handlebars are resting on the plate. A portion of the bracket affixed to the handlebar extends through the slot and is provided with a tabular extension that extends parallel to the plate in contact with the underneath surface thereof. The tabular portion extends toward the front of the bike such that it will catch the underneath surface of the plate, preventing removal of the handlebar from the plate when the handlebar is further secured thereto. The handlebar is further secured to the plate by means of a bolt which is additionally connected to the plate rearward of the handlebar. The bolt passes through an aperture in the bracket member and a nut or other suitable fixture secures the bracket to the bolt. Thus, in effect, the bracket secures the handlebar to the front of the plate which is toward the front wheel by passing through the plate and locking against the underneath surface thereof, and secures the rear of the handlebar to the plate by the bolt. The handlebar may further be provided with a slight protrusion at its midportion adjacent to the bracket. The protrusion extends downwardly toward the plate, with the plate additionally being provided with an indentation for receiving this protrusion. This further serves to lock the handlebar in place and prevent any rotary movement thereof toward or away from the rider during utilization. In order to disassemble the handlebar, one merely unfastens the nut on the bolt, tilts the handlebar forward breaking the contact between the tabular portion of the bracket underneath the plate and the bottom surface of the plate, and sliding that portion of the bracket out of the slot in the plate.

It is believed the invention will be more apparent from the following detailed description and drawings in which:

FIG. 1 is a pictorial representation of the handlebar and bracket assembly of this invention;

FIG. 2 is an exploded view of the detail of the handlebar, bracket and support plate of this invention;

FIG. 3 is a partially sectioned view taken along lines 3—3 of FIG. 1, showing the detailed construction of the bracket of the invention; and FIG. 4 is a sectional view taken along lines 4—4 of FIG. 3.

Turning now to the figures, there is seen the main frame 11 of a bike or motorcycle and the front frame portion 13 which normally supports the front wheel. This front assembly 13 is comprised of three tubular members 15, 17 and 19, disposed at three corners of triangular plates 21 and 23. The two outside members 15 and 17 extend through the plate to actually support the front wheel, while the third rear member 19 is for structural support only. This particular detail of construction is not important except for the fact that the top plate 23 be of the construction that will be further mentioned. The details shown in this drawing are for a particular form of a lightweight bike utilizing tubular frame members. Any suitable support for a top plate 23 is obviously contemplated. A conventional handlebar assembly 25 is shown attached to top plate 23. Top plate 23 is provided with an aperture or slot 27 towards its front or leading edge, and has a threaded bolt 29 extending upwardly toward the rear portion thereof.

A bracket 31 is shown welded to the handlebar assembly 25 at its midportion 33. The bracket 31 is essentially the same width as the slot 27 in the plate 23. Bracket 31 is formed of a top portion 35 which will be essentially parallel to plate 23 when the bracket is in place. A front portion 37 which is approximately normal to the top portion 35 passes through the aperture 27. Portions 36 and 37 are joined together by curved section 39 which surrounds the handlebar and is the place for welded attachment thereto. After the front portion 37 of the bracket passes through the aperture 27, it turns normally outward in a small tabular portion 41 which contacts the bottom surface of the plate 23 when the handlebar is affixed, as particularly seen in FIG. 3. The rear portion of the bracket is provided with an aperture 43 which passes over the bolt 29 such that a portion of the bolt extends therethrough at 45. The bolt is then secured to the bracket by means of a nut such as a wing nut 47.

Thus, to initially place the handlebar onto the bike, the assembly 25 is tilted slightly forward so that the tabular portion 41 can enter through the slot 27. After the portion 41 has passed through the slot, the handlebar is then tilted rearwardly, so that the aperture 43 on the bracket passes over bolt 29. The downward movement on the bolt is stopped by the engagement of tabular portion 41 with the bottom surface of plate 23. Wing nut 47 is then tightened on the bolt securing the handlebar in place. Thus, as can be appreciated, the handlebar is prevented from rotating toward the rider by the engagement of tubular portion 41 with the bottom surface of plate 23. Forward rotation of the handlebar away from the rider is prevented by engagement of the top surface of the bracket 35 with the wing nut 47, preventing upward movement along bolt 43. Any sideward movement of the handlebar is prohibited by the engagement of bracket 31 in slot 27 with both having equal dimensions.

To further insure the stability of the handlebar, there may be additionally provided a slight protrusion 49 formed on the handlebar at its midportion 33 adjacent to the plate 23. The plate 23 correspondingly then has an aperture 51 therein which engages protrusion 49. This is particularly well seen in FIGS. 3 and 4. This arrangement additionally helps to positively seat the handlebar in position in the bracket. Although it is not mandatory to successful operation of the device, it definitely aids in the overall functioning thereof.

Though the bracket 31 is disclosed as welded to the handlebar assembly 25, it is pointed out that the bracket may be attached in any suitable fashion so that it is rigidly connected to the handlebar. For example, the bracket could be formed with a knurled sleeve which would engage the handlebar assembly, having a bolt for tightening the sleeve into fixed engagement with the handlebar. Thus, any suitable arrangement is contemplated.

The features of this invention relate to leverage action obtained in the tabular portion 41 passing through the slot 27 at the front of the handlebar together with the bolt assembly at the rear of the handlebar. It is pointed out that the handlebar can be reversed from that shown in FIG. 1, wherein the grips would be turned in the opposite direction relative to a bracket assembly, such that the slot would be to the rear of the grips and the bolt and wing nut to the front thereof. This arrangement is not quite as suitable as that shown in the figures, since the greatest effort exerted on the handlebar is in a downward motion toward the driver. Thus, it is more important to have the secured bracket as shown with the leverage occurring along the bracket and the metal plate rather than this occurring at the nut 45.

While the device of this invention has been described and illustrated in detail, it is to be clearly understood that this is intended by way of illustration and example only and is not to be taken by way of limitation, the spirit and scope of this invention being limited only by the terms of the following claims.

I claim:

1. A detachable handlebar assembly for bikes comprising:
    a handlebar having a bracket rigidly affixed to the midportion thereof,
    a plate for permanent attachment to a frame of said bike, said plate having a slot therein and fastening means spaced from said slot such that said handlebar can be disposed between said slot and said fastening means,
    said bracket having formed thereon a protrusion that passes through said slot to lock with said plate,
    said bracket being further provided with means for cooperating with said fastening means to secure said handlebar to said plate.

2. The assembly of claim 1 wherein said bracket has a flat surface for passing through said slot terminating in a tabular portion extending normally outward from said handlebar.

3. The device of claim 2 wherein said flat surface and said tabular portion have a width equivalent to said slot.

4. The assembly of claim 1 further comprising:
    a raised portion formed on said handlebar surface adjacent said plate,
    corresponding indentation on said plate to receive said protrusion whereby said handlebar is further locked in place relative to said plate when affixed thereto.

5. The assembly of claim 1 wherein said fastening means comprises:
    a threaded bolt extending from said plate,
    said bracket having an aperture through which said bolt passes when said handlebar is seated on said plate,
    and means for securing said bolt to said bracket.

6. In combination, a bike having a detachable handlebar connected to the frame thereof comprising:
    a handlebar having a bracket rigidly affixed to the midportion thereof,
    a plate rigidly affixed to the frame of said bike, said plate having a slot therein and fastening means spaced from said slot such that said handlebar can be disposed between said slot and said fastening means,
    said bracket having formed thereon a protrusion that passes through said slot to lock with said plate,
    said bracket being further provided with means for cooperating with said fastening means to secure said handlebar to said plate.

7. The assembly of claim 6 wherein said bracket has a flat surface for passing through said slot terminating in a tabular portion extending normally outward from said handlebar.

8. The device of claim 7 wherein said flat surface and said tabular portion have a width equivalent to said slot.

9. The assembly of claim 6 further comprising:
    a raised portion formed on said handlebar surface adjacent said plate,
    corresponding indentation on said plate to receive said protrusion whereby said handlebar is further locked in place relative to said plate when affixed thereto.

10. The assembly of claim 6 wherein said fastening means comprises:
    a threaded bolt extending from said plate,
    said bracket having an aperture through which said bolt passes when said handlebar is seated on said plate,
    and means for securing said bolt to said bracket.

References Cited

FOREIGN PATENTS 200,941  10/1958  Austria.

FRED C. MATTERN, Jr., *Primary Examiner.*

B. T. CALLAHAN, *Assistant Examiner.*